Aug. 12, 1969     P. H. POINTER ET AL     3,460,842
MULTIDISC SHAFT SEAL
Filed Dec. 28, 1965
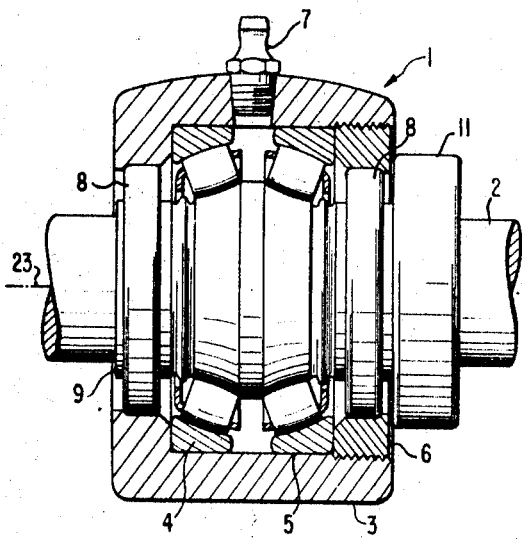
FIG.1
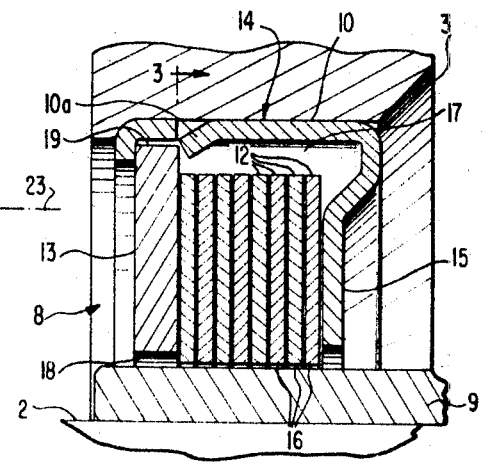
FIG.2
FIG.4
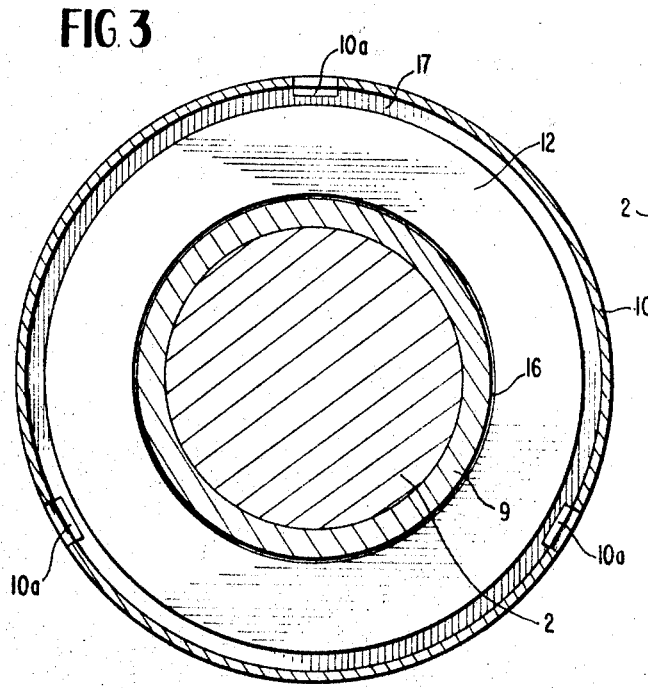
FIG.3
INVENTORS
PAUL H. POINTER
CONNER E. PRICE

United States Patent Office 3,460,842
Patented Aug. 12, 1969

3,460,842
MULTIDISC SHAFT SEAL
Paul H. Pointer and Connor E. Price, Indianapolis, Ind., assignors to FMC Corporation, a corporation of Delaware
Filed Dec. 28, 1965, Ser. No. 517,021
Int. Cl. B61f *15/22;* F16j *15/56, 15/00*
U.S. Cl. 277—2                             5 Claims

ABSTRACT OF THE DISCLOSURE

An annular oil seal for a rotating shaft subject to misalignment relative to the axis of the seal, comprising a series of thin annular sealing members of substantially the same inside and outside diameter surrounding the rotating shaft element with which the oil seal is associated, the inside diameter of each of said sealing members being slightly larger than the outside diameter of the shaft so as to provide a small inner clearance between said members and the shaft when said members and shaft are concentric, said oil seal further comprising housing means for containing said sealing members, said housing means comprising a guard washer having an inside diameter larger than the shaft for providing an inner annular clearance substantially greater than the inner clearance between said thin members and said shaft, said guard washer providing a positive stop to limit the maximum misalignment between the axis of the shaft and axis of the oil seal to an angle less than the angle at which said sealing members will be forced against said housing by the shaft which the seal is associated.

---

This invention relates to a seal for a rotating structure and has particular application to seals for high speed shafts supported in antifriction bearings such as roller bearings which shafts may be subject to misalignment relative to the support for the bearing outer race.

The sealing of high speed rotating shafts which are subject to misalignment presents special problems, particularly with regard to the occurrence of friction between the seal and the shaft. To overcome these problems, the tortuous passage type seal known as a labyrinth seal was developed. This type seeks to seal by using a tortuous path from inside to outside the seal formed by leaving a restricted opening alternately between the rotating member and alternate sealing members and between adjacent sealing members and the housing for the bearing. This type of seal, while proving satisfactory for many applications, presents problems when adapted to shafts which were subject to misalignment relative to the bearing housing axis. If the restricted opening is small enough to provide an adequate seal, it is too small to provide adequate tolerance for the possible misalignment of the shaft. On the other hand, where sufficient tolerance is provided for any expected misalignment, the openings are too large to seal properly.

A further disadvantage of seals which did provide for some misalignment was that when shaft misalignment exceeded the design limitations, the shaft would contact and crush the light sealing means against the housing, thus destroying the seal, usually without any indication to the operator that the design limits had been exceeded. This could result in unnoticed loss of lubrication and entrance of foreign matter in high speed machinery with consequent premature breakdown of equipment.

To overcome prior art shortcomings, it is a primary object of this invention to provide a highly efficient, inexpensive sealing means capable of allowing a certain amount of misalignment of the shaft relative to the bearing housing without losing sealing efficiency and also capable of indicating possible destruction of the sealing means when the design tolerances with respect to misalignment are exceeded.

It is a further object of this invention to provide a seal which is relatively thin in axial length in relationship to its sealing capacity.

It is a further object of this invention to provide a sealing means which may be easily packaged and sold as a unit.

These objects and others hereinafter appearing are attained by the present invention which generally relates to an annular oil seal for a rotating shaft subject to misalignment relative to the axis of the seal, comprising a series of thin annular sealing members of substantially the same inside and outside diameter surrounding the rotating shaft element with which the oil seal is to be associated, the inside diameter of each of said annular sealing members being substantially the same, although slightly larger than the outside diameter of the shaft so as to provide a small inner clearance between said members and the shaft when the shaft and said members are concentric, said oil seal further comprising housing means containing said sealing members, said housing means comprising a relatively thick guard washer having an inside diameter larger than the shaft thereby providing an inner annular clearance substantially greater than the inner clearance between said thin members and said shaft.

In the preferred embodiment of this invention, the seal comprises a series of thin resilient identical annular sealing members which are held in place by the action of interface friction produced by their being clamped together. At one end of the seal, there is a guard member comprising a heavy annular flat washer. The relationship between the sealing members and the guard member is such that upon misalignment, the shaft will strike the seal members first, moving them out of the way but without forcing them against the outer annular wall. When the misalignment reaches a predetermined maximum amount, the shaft comes in contact with the guard member giving an audible indication of excess misalignment between the shaft and seal axis while preventing the thin annular sealing members from being crushed.

The above and other objects of the instant invention will become more readily apparent by reference to the accompanying drawings in which a preferred embodiment is disclosed by way of example, various modifications and changes of details thereof being contemplated within the scope of the appended claims. The article of the invention is illustrated on the accompanying drawing in which:

FIGURE 1 is a partial sectional view of a bearing embodying the seal of the present invention.

FIGURE 2 is a detailed section through a seal of the present invention.

FIGURE 3 is a vertical section taken substantially on lines 3—3 of FIGURE 2.

FIGURE 4 is a view similar to FIGURE 2 showing another embodiment of the present invention.

FIGURE 1 shows a bearing assembly 1 for a high-speed shaft 2. Bearing assembly 1 comprises an outer bearing housing 3, roller bearings 4 and 5 and retainer ring 6, threadably received in housing 3 and locked in place by an appropriate set screw or other means, not shown. Retainer ring 6 serves to hold bearings 4 and 5 in place and to allow their replacement when necessary. The bearings are lubricated by means of fitting 7. The lubricating material, after it has been introduced through fitting 7, is retained in the bearing by means of a pair of seal rings 8 constructed in accordance with the present invention. Seal rings 8 have a common axis 23 which will normally and preferably coincide with the axis of the shaft when the shaft is not misaligned. The shaft 2 includes a sleeve 9 retained in place by lock ring 11 removably affixed to shaft 2. The sleeve 9 on the shaft 2 serves as the inner bearing race for the bearings 4 and 5.

Seal ring 8, as may be seen in FIGURE 2, comprises a series of thin annular sealing members 12 held within a housing 14. Housing 14 comprises an outer annular wall 10, a relatively thick guard washer 13 which serves as a guard means, and an indented end wall 15 which serves to clamp the sealing members 12 and the guard washer 13 together into frictional contact with each other so as to maintain them in position by interface friction. The outer wall 10 has a plurality of inwardly-pressed tabs 10a which function to hold guard washer 13 at one end of the housing 14 against it, being forced by external means toward sealing members 12 with excessive pressure.

The sealing members 12 have an inner clearance 16 between the sealing members and the outer diameter of sleeve 9 and a substantial outer clearance 17 between the outer diameters of the sealing members and the inner surface of outer annular wall 10. The guard washer 13, on the other hand, has an inner annular clearance 18 between the inner diameter of the guard member and the outer diameter of sleeve 9, and an outer annular clearance 19 between the outer diameter of the guard washer and the inner diameter of outer annular wall 10. The sum of the inner annular clearance 18 and the outer annular clearance 19 is less than the sum of the inner clearance 16 and the outer clearance 17, so that upon misalignment between shaft 2 and seal axis 23 beyond a certain limiting point, the guard washer 13 will contact the sleeve 9 on shaft 2 and be forced against the outer annular wall 10 before the thin annular members 12 come into contact with the outer annular wall 10. Thus misalignment beyond a certain predetermined amount, which is determined by the sum of the clearances 18 and 19, is prevented by the guard washer 13 or at least beyond this degree of misalignment, an audible indication of malfunctioning will occur to warn of improper usage of the seal and possible seal and even bearing destruction. The thin sealing members 12 are thereby protected from being caught between the sleeve 9 and the outer annular wall 10 by the guard washer 13 acting as a guard means and forming a positive or warning stop between the shaft and the outer annular wall 10.

In operation of the seal of FIGURE 2, the inner clearance 16 serves as the restriction which will maintain lubrication material inside the bearing. Because all the sealing discs are the same size, they each provide resistance to the flow of a fluid through the seal, thereby enabling the seal to be much smaller than if the sealing members were spaced apart. The sealing members are normally held in place by being clamped by the resilient action of the indentation 15 pressing toward guard washer 13. Interface friction between sealing members 12 will then hold the members in place.

Instead of being flat, the members 12 may have a certain random waviness to allow the discs to be assembled with some snugness in a housing slightly larger than the sum of the actual thicknesses of the discs.

Upon misalignment between the axis of the shaft 2 and the axis of the oil seal 8, the sleeve 9 on shaft 2 will urge the discs 12 to conform with the misaligned shaft. When the misalignment between the axis of the seal and the axis of the shaft 2 becomes too great, as pointed out above, the sleeve 9 will strike the guard member 13, forcing it against the outer annular wall 10 preventing any further misalignment and providing a loud audible warning to the operator that the design tolerances are being exceeded. This occurs before the sleeve has displaced sealing member 12 against housing wall 10 and thus the sealing members 12 are saved from destruction and a warning is sounded that the machine is not operating properly.

The embodiment of FIGURE 4 is similar to FIGURE 2 with the exception that the outer annular wall means 10 of the housing 14 is formed by a portion 20 of the outer race bearing housing 3. Also, indentation 15 of the FIGURE 2 embodiment is replaced by a retaining member 21. Retaining member 21, seal members 12 and guard member 13 are retained in place by locking ring 22, which is bolted, screwed, or otherwise removably attached to the housing 3. This embodiment operates in essentially the same way as the embodiment of FIGURE 2.

Although the sealing members 12 are shown clamped together for better performance, it should be understood that the seals will operate without the frictional fit and the sealing members 12 may be free enough to rest on the rotating shaft 2.

It is to be understood that the form of this invention herewith shown and described is to be taken as a preferred example of the same, and that various changes in the shape, size and arrangement of parts may be resorted to without departing from the spirit of the invention or the scope of the appended claims.

What is claimed is:

1. An oil seal for a rotating shaft subject to being operated misaligned with the axis of the seal comprising:
   a plurality of substantially identical thin flat annular sealing members,
   a guard washer constructed of substantially heavier material than said flat sealing members,
   a housing having an outer annular wall means,
   said sealing members having an inside diameter such that a smaller inner clearance is maintained between said members and the shaft with which the seal is associated,
   said outer annular wall means having an inner diameter larger than the outer diameter of said sealing members thereby forming an outer clearance between said sealing members and said outer annular wall means,
   said guard washer having an inner diameter larger than the diameter of the shaft and thereby forming an inner annular clearance between said guard washer and the shaft, said guard washer being further formed with an outer diameter less than the inner diameter of said outer annular wall means thereby forming an outer annular clearance,
   said inner annular clearance of said guard washer being greater than said inner clearance of said members and the sum of said inner annular clearance and said outer annular clearance of said guard washer being less than the sum of the inner and outer clearance of said members so that upon the occurrence of a misalignment greater than a predetermined maximum tolerable misalignment, said heavy guard washer will contact the shaft and said outer annular wall means thereby providing a positive stop or audible warning in operation and preventing the thin sealing members from being crushed against said outer annular wall means.

2. An annular oil seal for a rotating shaft subject to being operated misaligned with the axis of the seal comprising:
   a series of juxtapositionally related, thin, annular sealing members of substantially the same inside diameter adapted for surrounding the rotating shaft element with which the oil seal is to be associated, the inside diameter of each of said annular sealing members being substantially the same but slightly larger than the outside diameter of the shaft so as to provide a small inner clearance between said members and the shaft when the shaft and said members are concentric; and
   housing means containing said sealing members comprising a guard washer having an inside diameter larger than the shaft, thereby providing an inner annular clearance,
      said inner annular clearance being substantially greater than the inner clearance between the inside diameter of said sealing members and the outside diameter of the shaft, said sealing members being constructed with a slight random waviness so as to provide for frictional engagement between said sealing members, each of said sealing members being in a face-to-face frictional engagement with at least one adjacent sealing member.

3. An annular oil seal for a rotating shaft subject to being misaligned with the axis of the seal comprising:

a plurality of thin resilient sealing members;

an outside annular wall means surrounding said sealing members; and guard means comprising a heavy annular guard washer operable upon misalignment between the seal axis and the axis of the shaft greater than a predetermined maximum to limit further misalignment and provide a positive stop between the shaft with which the seal is associated and the outside annular wall means, said guard washer being so proportioned that said positive stop exists at an angle of misalignment between the axis of the shaft and the axis of the oil seal less than the angle at which said sealing members will be forced against said housing by the shaft with which the seal is associated, said guard washer having an inner diameter larger than the shaft, thereby forming an inner annular clearance between the inside diameter of said guard washer and the shaft, said guard washer having an outer diameter smaller than said outer annuar wall means thereby forming an outer annular clearance between said guard washer and said outer annular wall means, said plurality of thin sealing members annular in shape and having an inner diameter larger than said shaft thereby forming an inner clearance between said seal members and said shaft, said members having an outer diameter less than said outer annular wall means thereby forming an outer clearance between said seal members and said outer wall means, the inner clearance of said sealing members being less than the inner annular clearance of said guard washer whereby upon small misalignments of the shaft with the oil seal axis only said sealing members will be contacted, and the sum of the inner annular clearance and the outer annular clearance of said guard washer being less than the sum of the inner clearance and outer clearance of said sealing members whereby upon misalignment of the shaft with the oil seal axis beyond a predetermined maximum, said guard washer will be forced by the shaft against said outer wall means, thereby providing a positive stop and audible warning in operation while preventing misalignment to the point where said sealing members are forced by the shaft against said outer wall means.

4. An annular oil seal for a rotating shaft subject to being operated misaligned with the axis of the seal comprising:

a series of juxtapositionally related, thin, annular sealing members, each member being substantially planar presenting opposed, generally parallel faces, each member defining a substantially circular opening, said openings being substantially equal in diameter, said members being disposed in face-to-face relationship with adjacent faces frictionally engaged and with said openings in substantial alignment, said openings being slightly larger in diameter than a shaft to be rotatably received therein, whereby to provide a small inner clearance between the members and the shaft when the shaft is rotatably received within the openings; and housing means containing said members including a guard washer defining an inner circular hole of slightly larger diameter than said openings, said hole normally being coaxially aligned with the openings, providing an inner annular clearance between the washer and the shaft when the shaft is received in the hole and the openings, said inner annular clearance being substantially greater than the inner clearance between the inside diameter of said sealing members and the outside diameter of the shaft.

5. An annular oil seal as recited in claim 4 wherein said housing means includes means coacting with said sealing members exerting an axial clamping force thereon.

References Cited

UNITED STATES PATENTS

| 1,848,613 | 3/1932 | Flanders | 277—2 |
| 2,817,544 | 12/1957 | Von Der Nuell. | |
| 2,971,783 | 2/1961 | Laser | 277—83 X |
| 3,001,806 | 9/1961 | Macks | 277—174 X |

FOREIGN PATENTS

| 1,029,590 | 3/1953 | France. |

SAMUEL ROTHBERG, Primary Examiner

U.S. Cl. X.R.

277—53, 174